(12) United States Patent  
Kirschner

(10) Patent No.: US 7,728,963 B2
(45) Date of Patent: Jun. 1, 2010

(54) METHOD FOR DETERMINING THE ORIENTATION OF AN ORIENTATION INDICATOR

(75) Inventor: Holger Kirschner, Heerbrugg (CH)

(73) Assignee: Leica Geosystems AG, Heerbrugg (CH)

( * ) Notice: Subject to any disclaimer, the term of this patent is extended or adjusted under 35 U.S.C. 154(b) by 299 days.

(21) Appl. No.: 11/719,636

(22) PCT Filed: Nov. 4, 2005

(86) PCT No.: PCT/EP2005/055756

§ 371 (c)(1),
(2), (4) Date: Aug. 20, 2007

(87) PCT Pub. No.: WO2006/053837

PCT Pub. Date: May 26, 2006

(65) Prior Publication Data

US 2008/0218728 A1 Sep. 11, 2008

(30) Foreign Application Priority Data

Nov. 19, 2004 (EP) .................. 04027500

(51) Int. Cl.
*G01C 1/00* (2006.01)
*G01C 3/08* (2006.01)
(52) U.S. Cl. .............. 356/141.2; 356/4.01; 356/152.1
(58) Field of Classification Search ............ 356/3.13, 356/3.14, 4.01, 5.1, 141.2, 152.1
See application file for complete search history.

(56) References Cited

U.S. PATENT DOCUMENTS 6,667,798 B1 12/2003 Markendorf et al.
7,312,862 B2 * 12/2007 Zumbrunn et al. ..... 356/139.03
7,515,256 B2 * 4/2009 Ohtomo et al. .......... 356/141.1

FOREIGN PATENT DOCUMENTS

| CH | 676 042 | 11/1990 |
| EP | 1 024 343 | 8/2000 |
| EP | 1 081 459 | 3/2001 |
| EP | 0 880 674 | 2/2002 |
| WO | WO 91/16598 | 10/1991 |
| WO | WO 03/062744 | 7/2003 |

* cited by examiner

*Primary Examiner*—Isam Alsomiri
(74) *Attorney, Agent, or Firm*—Workman Nydegger

(57) ABSTRACT

A separation from at least one and an image of at least three reflective regions on the orientation indicator are recorded by a separation measurement sensor and an image sensor in a measuring device, for the purpose of determining the orientation of an orientation indicator. The separation measurement and image recording are achieved by means of a directed emission of a collimated first beam and a divergent second beam with differing wavelengths and/or polarization in the direction of the orientation indicator and a simultaneous recording of the reflected and/or scattered first and second beams. The reflective regions on the orientation indicator are embodied and arranged such as to be positioned at a target point with a detectable geometric relationship to each other and to be simultaneously resolved by the image recorder. By means of the orientation determination, amongst other things, separations from target points, even not directly visible, can be precisely determined.

22 Claims, 4 Drawing Sheets

5A  5B 5C  5D

METHOD FOR DETERMINING THE ORIENTATION OF AN ORIENTATION INDICATOR

The invention relates to a method for determining the orientation of an orientation indicator and to an orientation indicator as well as to the use of the method and the use of the orientation indicator.

BACKGROUND

Knowing the orientation of an arrangement is important in many applications, for instance in surveying when measuring the distance to a target point via a reflector pole possibly not standing vertically above the target point, in aeronautics and astronautics when docking aircraft for refueling, for instance, or in the automatic control of machines monitoring the course of a newly built road. In these areas, the position of a target point in space often is determined by optical measuring instruments such as theodolites, cameras, or laser range finders. For the measurements, often a tactile tool having light-emitting and/or light-reflecting points is positioned at the target point.

Thus, in WO 91/16598 a system for determining the condition of a surface is disclosed where the system is composed of at least two opto-electronic sensors and a tool, said tool being equipped with at least two light sources and three contact points or a contact area. The tool is fixed to a surface by means of the contact points, and the orientation of the surface is determined from the measured space coordinates of the light sources and their known positions relative to the contact points. However, for such a tool for determining the orientation, a power supply is needed at the target position, which often cannot be furnished when the targets are of difficult access.

In EP 0 880 674 a method is disclosed that can be used to determine the space coordinates of target points via a combination of laser distance measurement and photogrammetry. In this method a tactile tool having several reflecting points is positioned at a target point. A laser area finder will measure the distance to one or several reflecting points, while a camera takes a picture of the reflecting points. On top of the camera a flash lamp is fixed as a target illumination for illuminating the reflecting points. From the image of the reflecting points in the camera sensor, the position and orientation of the tactile tool are calculated. The system is optimized primarily for measurements over short distances, particularly so for the automobile and aircraft industry, since a flash lamp having a short illuminating range is used for illumination, so that the measuring range is short as well. In addition, in measurements over large distances the distance of separation becomes hard or impossible to measure, since several reflecting points will enter the field of vision of the EDM. The method also is subject to errors when using reflectors as the measuring points of the camera, rather than measuring points actively emitting radiation, since there is no coupling of the target illumination into the camera's optical axis. Here the error committed in determining the position of the measuring points is of the same order of magnitude as the distance of the target illumination source from the camera's optical axis. The method lacking actively light emitting measuring points thus will not be suitable for geodesically relevant measuring accuracies.

SUMMARY

It is the task of the present invention, therefore, to remedy the defects of the prior art and provide a method that can be used to determine the orientation and/or position of an orientation indicator with the accuracy generically required, even over distances of geodesic relevance, including amongst other things the position of a target point that is not directly visible, and that can also be used to automatically control vehicles such as construction machinery.

It is a further task of the invention to provide an orientation indicator having reflecting segments that is realized in such a way that it can be positioned at a target point, and its orientation can be determined highly accurately with a measuring instrument, more particularly a tachymeter, over large distances and within a short time.

In a method according to the invention, for determining the orientation and/or position of an orientation indicator, a measuring instrument is used that has distance measuring sensors and image acquiring sensors, more particularly a tachymeter or a telescopic sight with integrated range finder and integrated camera. Preferably, the distance measuring sensors, the image acquiring sensors, as well as the measuring beams for target illumination are coaxial, that is, the optical axes of the distance measuring and image acquiring sensors as well as the central rays of the measuring beams to a good approximation are all on one axis outside the measuring instrument.

An arrangement is provided for the orientation indicator that comprises at least three reflecting segments and can be positioned and/or fixed at a target point. With the measuring instrument, one image of the at least three reflecting segments is acquired and the distance to one reflecting segment is measured. Regardless of the positions of the segments relative to each other, the segment used for measuring the distance is formed so that it can be distinguished from the other segments. Distinguishability can be achieved, for instance, by geometric shape or spectral properties of the areas. The arrangement may have more than three reflecting segments. A reflecting segment should be understood as being a segment reflecting radiation emitted from a source of radiation and striking the segment. The segment should of course reflect the radiation in such a way that the radiation will reach a detector. Preferably, retroreflectors are used as the reflecting segments. However, reflectors reflecting the radiation non-directionally, or reflectors reflecting the radiation directionally, or a combination of the two may also be used.

The reflecting segments have a known mutual geometric relationship, and are set up in such a way that the image acquiring sensors may resolve them simultaneously. A particularly advantageous arrangement of the reflecting segments is one that is not collinear, the reflecting segments more particularly should be arranged on a line of sight from the measuring instrument to the orientation indicator, in such a way that they will not hide each other completely. Whether this requirement can be met will of course depend on the orientation of the orientation indicator and its orientation relative to the image acquiring sensors. With an arrangement including more than three reflectors, it will not be a problem in general to set them up in a noncollinear way so that it will not happen in any position or orientation of the arrangement that all reflecting segments would hide each other. However, the complexity increases when a large number of reflecting segments is present, inasmuch as an individual segment, in order to be identified, must be able to be distinguished from the other segments. Moreover, it must be secured that the image produced by the image acquiring sensors can be resolved. Thus, it is true that with an arbitrary increase in the number of reflecting segments, it will be secured that at least three segments may be captured, but at the same time more effort must be expended on account of the higher complexity.

Therefore, the shape and arrangement of the reflecting segments should allow for these two contradicting requirements.

At the measuring instrument, radiation is emitted directionally toward the reflecting segments of the orientation indicator, is reflected and/or scattered by these reflecting segments, and is acquired by the sensors in the measuring instrument as reflected and/or scattered radiation. A laser is preferably used as the emitter of radiation. The sensors for the electronic distance measurement and those for the image acquisition are coaxial, that is, outside the instrument, the optical axes of said sensors coincide to a good approximation. The radiation emitters for the distance measurement and for image acquisition or measurement of direction are introduced in such a way that their virtual images, seen from outside the instrument, also are on said axis, such that a coaxial illumination of the target is available for distance measurement and for image acquisition. Using coaxial radiation emitters/target illuminators, one can achieve measuring accuracies meeting geodesic requirements, for instance. Particularly now that in many applications of geodesy, reflecting segments are used instead of actively emitting measuring points, precision measuring instruments are needed in order to meet generic measuring accuracy requirements. In receivers for measuring distances and acquiring images that have a field of vision that can be changed in a defined way, as for instance in tachymeters, and in coaxial target illuminators, the target illuminator is oriented toward the current field of vision of the receiver. By concentrating the emitted radiation to the field of vision of the receiver, and orienting the target illumination to the field of vision of the receiver, a larger measuring range and lower power consumption can be achieved as compared with a target illumination that is not adapted.

Distance measurement and image acquisition occur simultaneously; the distance is measured to one reflecting segment, an image is acquired of at least three reflecting segments. Images from more than three reflecting segments may also be acquired. For instance, four reflecting segments could be provided, with the distance being measured to a first reflecting segment and the acquision of the images and/or measurement of direction being made toward a second, third, and fourth segment. For better separation of distance measurement and image acquisition, two different beams are emitted from the measuring instrument: a first collimated beam and a second divergent beam. The two beams also differ in their wavelength or polarization, or in their wavelength and polarization. Here the divergent beam preferably has a divergence that corresponds to the field of vision of the image acquiring sensors that is typical for geodesic applications and is wider than the field of vision of the distance measuring sensors. The relatively small divergence needed for target illumination provides long-range capability of the method without violating laser safety prescriptions. A collimated beam is understood as being a beam having a generically small angular aperture of for instance 0,5°.

In measurements covering large distances, possibly more than just one reflecting segment comes into the range of vision of the distance measuring sensors, and the distance cannot be measured correctly, nor selectively. Often, therefore, it will be appropriate to associate filters with the reflecting segments or introduce filters into the optical beam path. This association is achieved by introducing the filter(s) into the beam path between sensor and orientation indicator, for instance using filters set up in front of the reflecting segments or attached to the reflecting segments, but equally well by making the reflecting segments themselves of or with a filter material or by equipping the sensors with filters. Preferred filters are spectral or polarization filters, for instance interference and/or absorption filters can be used. In addition, the reflecting segments preferably are made in different sizes, so that the different reflecting segments may be more readily distinguished in the image produced in the image sensor. Generally the retroreflector to which the distance is measured is made larger than the other reflectors. Having reflecting segments of this kind which can be distinguished independently of their relative positions, the orientation indicator will be suitable more particularly for overhead measurements.

The reflecting segments may have different shape and layout. A particularly large goniometric range is obtained when using reflecting segments in the shape of all-around reflectors such as sphere-shaped 4π reflectors. Cylindrical or spherical 360° reflectors may also represent the reflecting segments. Another possibility are reflecting segments in the shape of prisms, and more particularly triple prisms. Polished steel elements, glass mirror elements, elements sheathed with reflector foil or elements, more particularly balls, made of a reflecting material may also be employed. Reflector foil is a reflecting material that is readily available, but more precise measurements can be secured with reflectors made of triple prisms or microlenses, for instance the so-called "cat's eye" reflectors.

Generally, the reflecting segments are tied together via a connecting unit, for instance struts. An arbitrary arrangement will do, such as star-shaped or triangular, provided the reflecting segments may be separately perceived by the image sensor in any position of the arrangement that is relevant for measurements. The reflecting segments, possibly tied together, often are fixed at an additional element having a detectable geometry, called a reflector support in what follows. This may for instance be a reflector pole placed at a target point for surveying purposes. It may be fastened in such a way that the center of gravity of the arrangement coincides with the center of gravity of the reflector support, which for practical uses will often be an advantage, but the method of fastening may be varied depending on the application. With the reflector support positioned at the target point for the purposes of measuring a distance and/or position, it will be possible via the determination of distance to a reflecting segment at the reflector support and via the determination of the position or directions in space toward this and at least two further reflecting segments at the reflector support, and also via the known geometric relationships among the reflector segments and between the reflector support and the reflecting segments, to determine highly accurately the orientation of the reflector support and with it the distance or position of the target point. There is no longer any need for leveling the reflector support, which often is error-prone and requires extensive manipulations. Using this method one can also determine distances from or positions of target points that are not directly visible from the measuring instrument, that is, so-called hidden points such as points in sewer shafts, for instance by positioning the reflector support at such a point or by measuring into the shaft with a range meter, for instance, to which an orientation indicator has been attached.

Range measurements generally are made by a laser distance measurement while the orientation generally is determined via image capture. Virtual images of the target illuminator produced by the reflecting segments for instance are imaged in an image sensor, and the directions in space toward the reflecting segments are determined from the positions of these images. The image sensor may for instance be a CCD image area sensor or a camera.

Another possible application of the method for orientation determination or of the orientation indicator according to the invention is found in automatic machine control. The orientation indicator is attached to a piece of construction machinery, for instance, and a monitoring of the slope of a road and automatic control of the driving path of the piece of machinery are possible, for instance via a determination of the orientation assumed by the orientation indicator at all points in time, and thus a determination of the orientation of the piece of machinery itself.

BRIEF DESCRIPTION OF THE DRAWINGS

The method and orientation indicator according to the invention, as well as the use of the method and orientation indicator according to the invention, are described in the following in greater detail, and purely by way of example, with the aid of specific embodiments represented schematically in the drawings, while at the same time dwelling on further advantages of the invention. Shown in particular are in.

DETAILED DESCRIPTION

Figure 1:
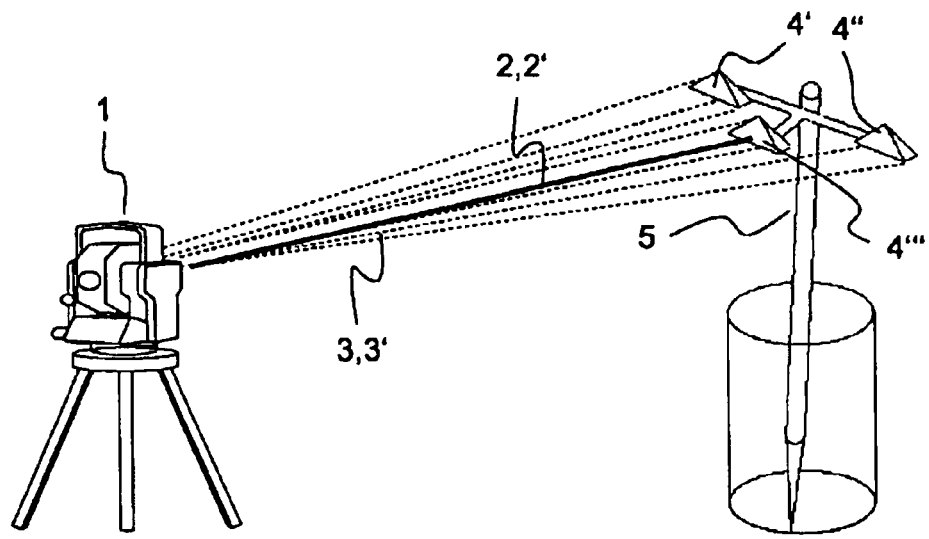
FIG. 1 a possible measuring arrangement for a method according to the invention, FIG. 2 a possible measuring instrument for realizing a method according to the invention, FIG. 3 in four figure parts 3A, 3B, 3C, 3D, possible embodiments of an orientation indicator according to the invention, FIG. 4 in two figure parts 4A, 4B, two embodiments of reflecting segments associated with a reflector support, and their images, FIG. 5 in four figure parts 5A, 5B, 5C, 5D, four possible embodiments of an orientation indicator according to the invention, FIG. 6 a representation serving to explain geodesically relevant measuring accuracies, FIG. 7 a use of the orientation indicator according to the invention for monitoring a piece of construction machinery, FIG. 8 a representation explaining measuring errors.

FIG. 1 shows a possible arrangement for realizing a method according to the invention for determining the orientation and/or position of an orientation indicator including the measuring instrument 1 and an orientation indicator. The measuring instrument 1 that is shown may be a tachymeter with a theodolite and an EDM coaxial with the optical axis of the tachymeter, it may equally well be a telescope with integrated range meter 12 and integrated camera, or another optical instrument for measuring the distances and acquiring the images or determining the directions. The orientation indicator is made with three reflecting segments, for instance three retroreflectors 4', 4'', 4''', tied together with struts and fastened to a reflector support 5, viz., a range pole. The retroreflector 4''' in the middle is spectrally distinguishable from the other two reflectors 4', 4''. It is understood that combinations of segments reflecting non-directionally and segments reflecting directionally may be used as the reflecting segments.

The reflecting segments need not be tied together by struts, they may also be fastened directly to the reflector support 5, for instance to a support plate fixed at the reflector support 5. In FIG. 1, the reflecting segments are represented as triple prisms. The reflecting segments may of course have any shape appropriate to the particular application, for instance as spheres, all-around reflectors or cylindrical reflectors. The solid line in FIG. 1 designates the collimated beam 2, 2' used for measuring the distance while the dashed lines indicate beams 3, 3' used for image capture. Preferably, the distance is measured with a laser beam having a first wavelength. This laser beam is exactly pointed at an individual reflecting segment 4''' that is made distinguishable for the purposes of measuring distances, and the distance to this segment is determined in known manner. It is advantageous here when measuring distances to use a collimated beam 2, insofar as one wants to prevent the distance measuring sensors to receive radiation from more than one reflecting segment, and the measurement be falsified by overlapping reflected and/or scattered beams from different reflecting segments. It is for the same reason that preferably, for capturing an image, radiation of a second wavelength is used that differs from that used for measuring the distance. The beams 3 used for capturing images preferably have a divergence corresponding to the field of vision of the image capture, that is, a largest possible number of illuminated reflecting segments should be captured by the image sensor.

Figure 2:
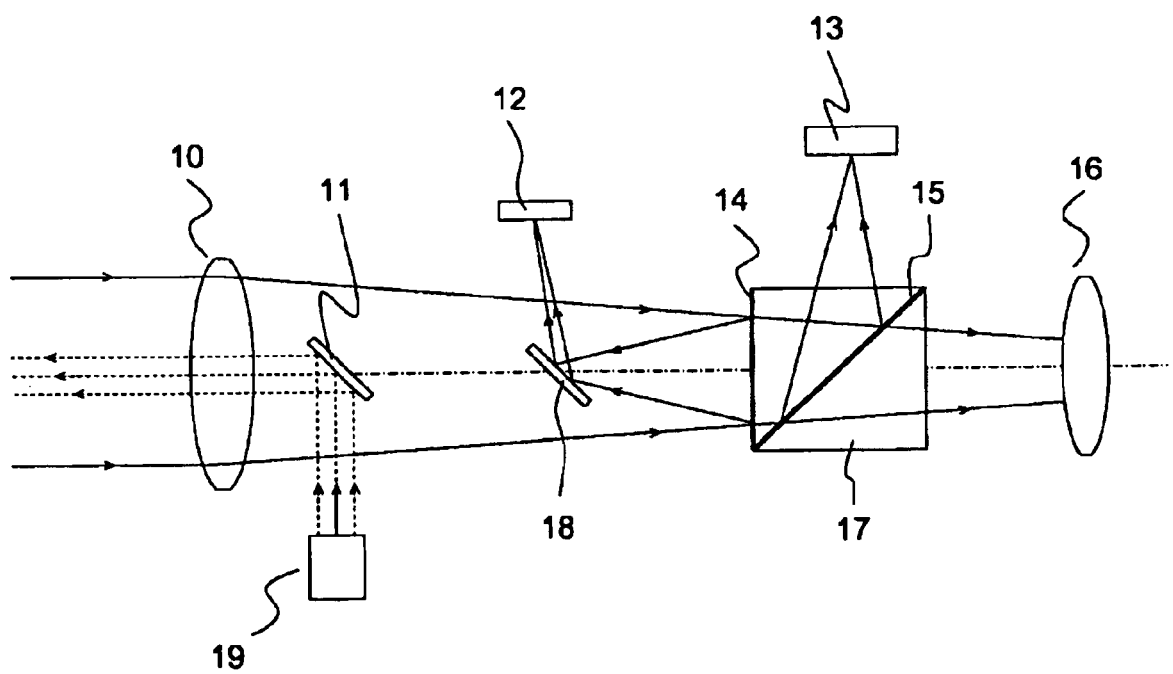

FIG. 2 shows a possible design of a measuring instrument 1 serving to realize the method according to the invention. In this example the measuring instrument is made in the form of a telescope with integrated distance measuring sensor 12 and integrated image acquiring sensor 13. Radiation is emitted directionally from a source 19 of radiation. Lasers are preferred sources 19 of radiation. The radiation emitted is directed toward an orientation indicator by a first reflecting element 11 that here is represented as a mirror having a reflecting layer. Beams reflected and/or scattered by the reflecting segments of the orientation indicator toward a lens 10 are directed by lens 10 to a beam splitter cube 17 having layers 14, 15, one dichroic and one partly permeable to the beams. Of course, the beam splitter cube may be replaced by another optical element having similar optical properties. More particularly, a second dichroic layer may be used instead of the partly permeable layer. The beams having the first wavelength are reflected and/or scattered at the dichroic layer 14 of beam splitter cube 17, and directed toward a second reflecting element 18, here a mirror having a reflecting layer, which separates the beams from the optical axis of the measuring instrument and directs them to the distance measuring sensor 12. The beams having the second wavelength pass through the dichroic layer 14 and are separated and directed toward the image sensor 13 at the second layer 15 that is partly permeable to the beams. For observation, or in combination with a sight marking for pointing, the beams may be directed toward ocular 16.

By virtue of this design, the optical axis of the electronic distance meter and the optical axis of the image sensors to a good approximation coincide with the target axis of the measuring instrument. By virtue of the coaxial design, the virtual images of the emitters for the electronic distance measurement and for the image sensors also are located on this axis when observed from outside the instrument.

Figure 3:
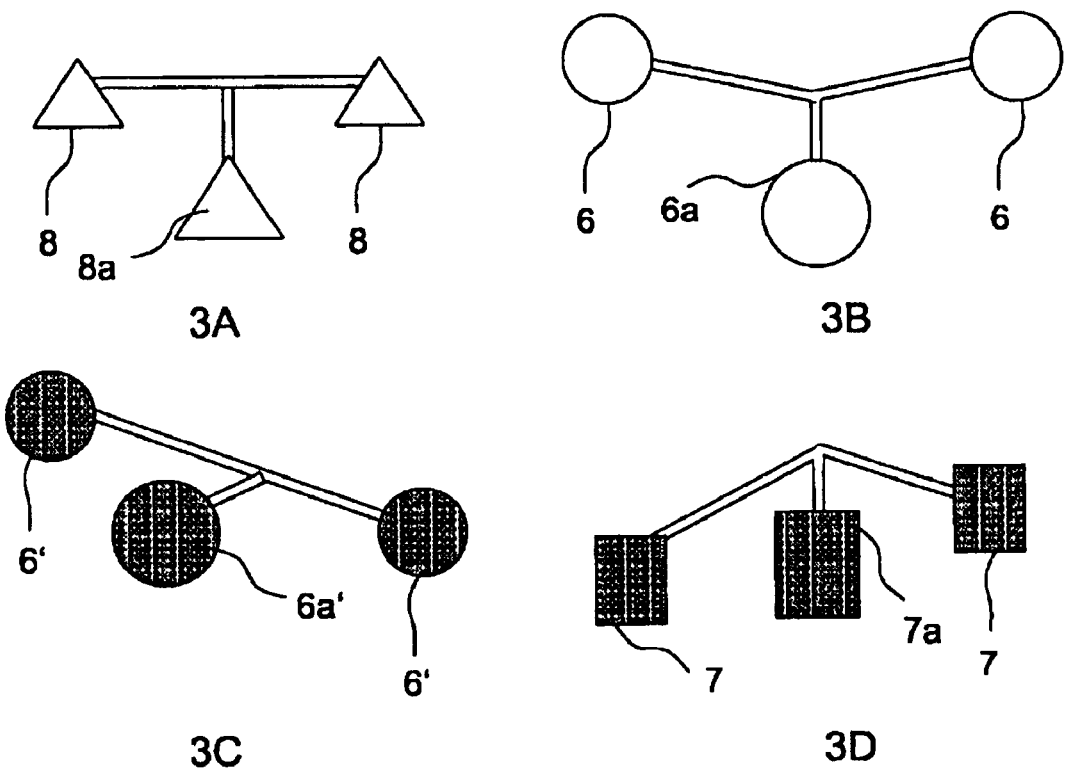

In FIG. 3, four embodiments of an orientation indicator according to the invention are represented. The orientation indicators have three reflecting segments each, the central segment always having a shape that can be distinguished from that of the other segments, for the purposes of measuring distance. Distinguishability is achieved by having segments of different size.

FIG. 3A shows an orientation indicator having reflecting segments, here in the shape of triple prisms 8, 8a, tied together by connecting elements, here represented as struts. FIG. 3B shows an orientation indicator having reflecting segments 6, 6a in the shape of spheres attached to the struts. The reflecting segments of FIGS. 3A and 3B may for instance be made of a reflecting material, e.g., mirror glass or polished steel, but may also be sheathed with reflector foil or with another reflecting material. In FIG. 3C an orientation indicator having spherical all-around reflectors 6', 6a' as the reflecting segments is represented. The spherical all-around reflectors 6', 6a' are fastened to a connecting unit, and made of a material of the cat's eye kind, i.e., composite triple prisms or microlenses. FIG. 3D shows an arrangement of reflecting segments consisting of microlens or triple-prism-based material, and having a cylindrical cross section, that are made into 360° reflectors. The cylindrical 360° reflectors 7 are tied together in such a way that when measuring with a tachymeter for instance, they are not behind one another on a target line between the tachymeter optics and the reflecting segments, and not all reflecting segments have the same distance from the tachymeter.

Figure 4:
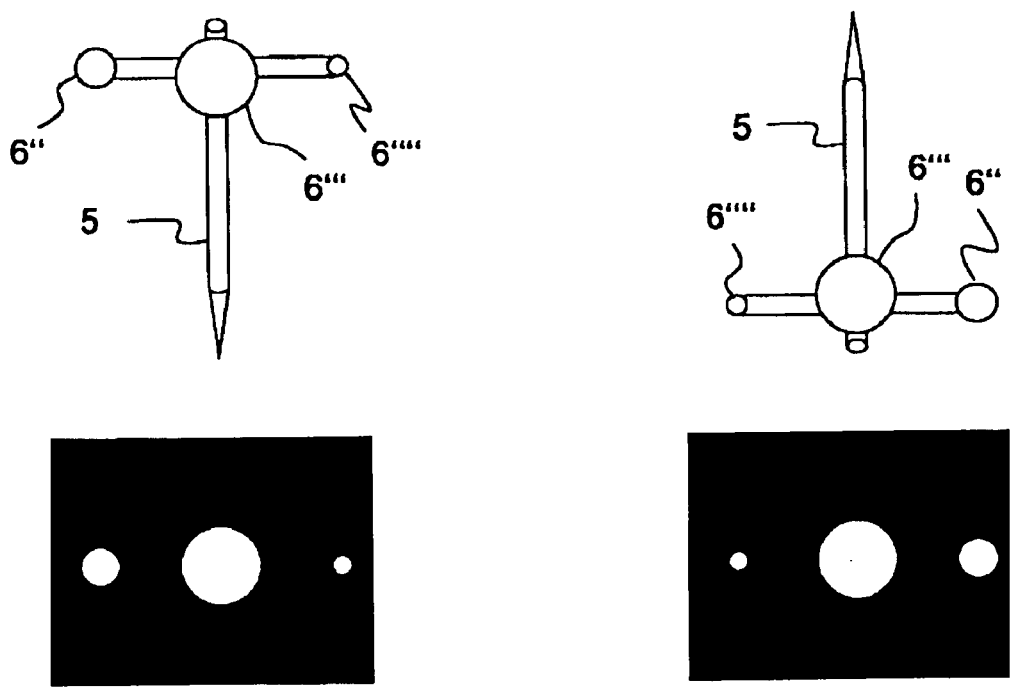

FIG. 4 shows an orientation indicator according to the invention in two embodiments having reflecting segments 6", 6''', 6'''' of different size, and the images of these segments in an image sensor 13. In the upper parts of FIGS. 4A and 4B, in each case the orientation indicator according to the invention is shown with reflecting segments 6", 6''', 6'''' of different size that are tied together and mounted on a reflector support 5. When having reflecting segments 6", 6''', 6'''' of different size, the distance preferably is measured to the largest reflecting segment. Here the reflecting segments are shown as spheres, but of course they could equally well be in the shape of circles, triangles, quadrangles, or prisms, cubes, cylinders or any other element having a detectable geometry. Nor is it necessary that all reflecting segments have the same geometric shape. It may in certain situations even be advantageous to combine reflecting segments that differ in their shape and/or size. Having reflecting segments made in different sizes yields the possibility of an unambiguous identification of the reflecting segments. A differentiation thus is possible, essentially without any restriction as to the range of orientations taken up by the orientation indicator, contrary to a differentiation of the reflecting segments in terms of their relative positions (such as left-hand segment/right-hand segment) that represents a strong restriction as to the possible range of orientations of the orientation indicator. The range of orientations is the range of possible orientations of the orientation indicator relative to the measuring instrument within which the orientations admit unambiguous measurements. A range of orientations that has been made larger by using segments distinguishable irrespective of their relative positions, implies that measurements can be made over a large goniometric range, including for instance overhead measurements, see FIG. 4B. Such an overhead measurement could for instance be a measurement toward a ceiling in a room. Where the reflecting segments can only be distinguished by their relative positions, an erroneous identification of the segments will occur in at least one of the two orientations of the orientation indicator from FIGS. 4A and 4B.

The representations in the lower parts of FIGS. 4A and 4B show the images produced in the image sensor 13 of the corresponding reflecting segments 6", 6''', 6'''' of different size from the corresponding upper-part representations. It is clearly visible that the images in the image sensor 13 can at once be unambiguously associated with the reflecting segments 6", 6''', 6'''' of different size.

Figure 5:
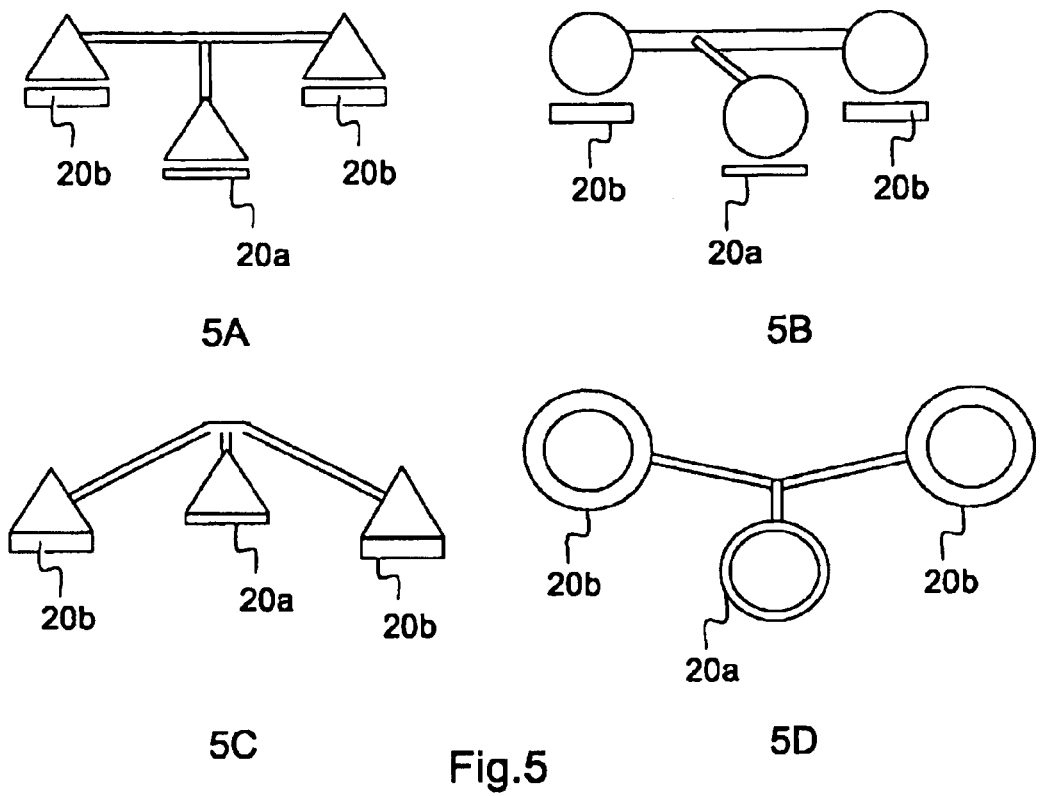

FIG. 5 represents four possible embodiments of an orientation indicator according to the invention, having filters 20a, 20b such as spectral, polarization, interference, or absorption filters. Here in each case a filter 20a is transparent, both to the radiation used to determine the directions in space and to the radiation used in the electronic distance measurements. Moreover, two filters 20b of a different type are used that absorb and/or scatter the radiation of the electronic distance measurement but are transparent in the spectral range of the image capturing sensors. In FIGS. 5A and 5B, filters 20a, 20b are set up in front of the reflecting segments, while in FIGS. 5C and 5D the filters 20a, 20b are mounted directly onto the reflecting segments. It would further be possible to make the reflecting segments of filter material. Using filters 20a, 20b or filter materials is a particular advantage for measurements over large distances. In fact, in measurements over large distances, a risk exists that more than one reflecting segment will happen into the field of vision of distance measuring sensor 12, and the distance measurement is falsified in this way. For this reason, preferably filters 20b selected so that the beam used for measuring distance is not reflected are placed in front of the reflecting segments to which a distance will not be measured. Of course, when interference of foreign light is not overly large, one can work without the filter 20a that is transparent to both wavelengths.

Figure 6:
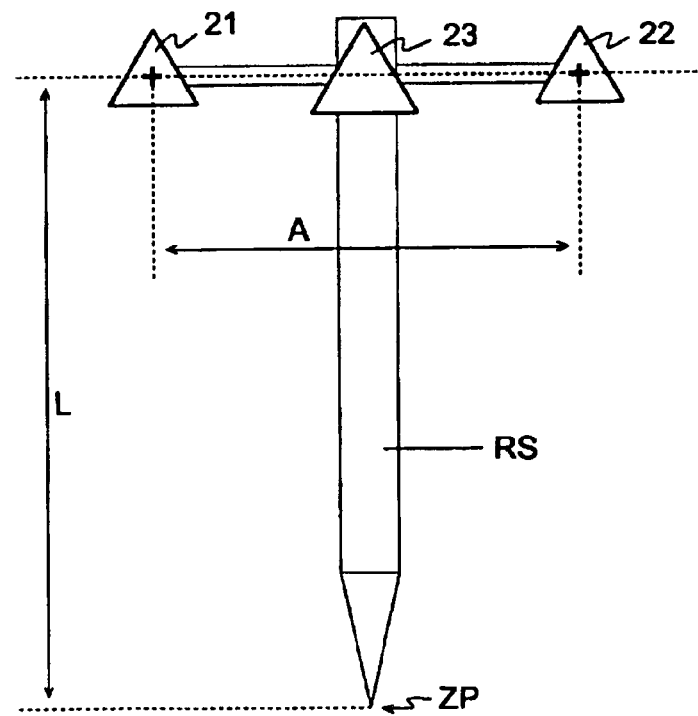

FIG. 6 is an orientation indicator positioned above a target point ZP. With reflectors, the orientation indicator is designed more particularly for geodesic applications. A first, second, and third reflector 21, 22, 23 are attached to a reflector pole RS while the reflector pole RS itself is positioned at a target point ZP. The distance to the third reflector 23 and the directions in space toward the first, second, and third reflectors 21, 22, 23 are determined in order to determine the position of target point ZP. From the data on distance and direction for the third reflector 23, the position of a reference point of the third reflector 23 can be derived. From the reference point position and from the space direction data for the first and second reflectors 21, 22, the orientation of the reflector pole RS and—via the known length of the reflector pole—the position of target point ZP can be derived. In the following, the conditions that must be met in order to achieve generic measuring accuracy will be explained with a numerical example. The position of target point ZP is supposed to be determinable with an accuracy of ±2 mm. Using an orientation indicator having a reflector pole length L of 1.5 m, which is practically relevant, and a reflector arrangement (A) extending over a length of 200 mm, the demanded measuring accuracy can only be attained with a measuring instrument having—essentially—coaxial target illuminators and receivers (for measuring distance and capturing the image), the orientation indicator being useful for measurements down to a minimum distance of 2 m. With a measuring instrument having a design where the target illuminator and receiver are not coaxial, for instance with an offset of 3 mm between the optical axes of target illuminator and receiver, the target point position can no longer be determined with the demanded accuracy of ±2 mm.

Figure 7:
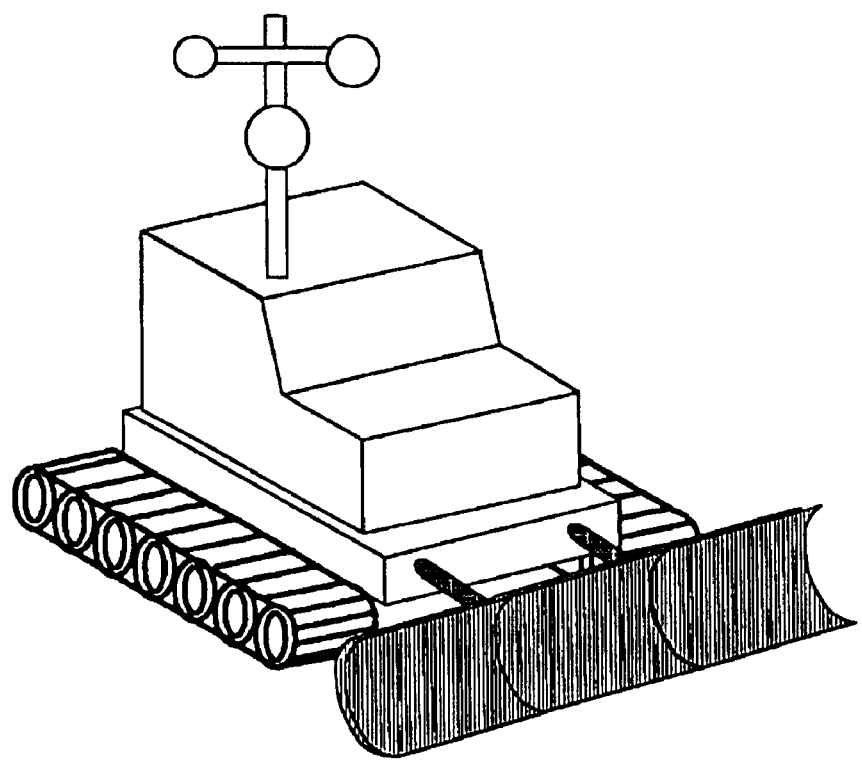

FIG. 7 shows a use of the orientation indicator or method for determining the position and orientation of an orientation indicator in automatic machine control. An orientation indicator is tied to a piece of construction equipment, for instance. Using a measuring instrument 1, a tachymeter for instance, one can determine the position and orientation of the orientation indicator, and thus the position and orientation of the machine to which the orientation indicator is attached. In this way a monitoring and, on this basis, an automatic control of the machine is possible. From the prior art it is known to determine the positions of several reflectors, GPS receivers, or laser receivers for the purposes of automatic machine control. In the method according to the invention, it is sufficient for automatic control of the machine to have one orientation indicator not requiring power on the machine, and to make a measurement of it just once—the simultaneous measurement of one distance and three space directions.

Figure 8:
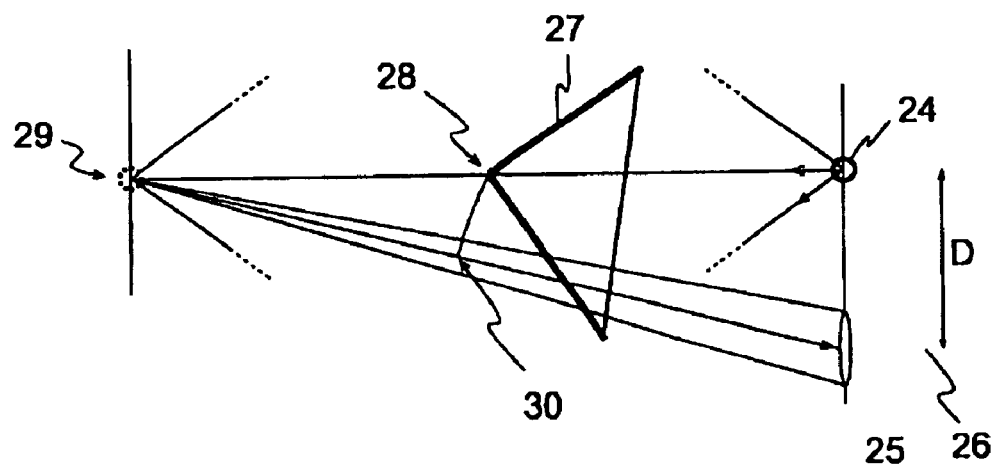

FIG. 8 sketches an optical arrangement for explaining in terms of an example, measuring errors in a non-coaxial layout of target illuminator and receiver. Here the optical arrangement comprises a target illuminator 24 emitting beams, a retroreflector 27 reflecting the beams, and a receiver 25 receiving the reflected beams for a determination of the direction toward a reference point 28 of retroreflector 27 by means of the beam received. The target illuminator 24 is set up at a distance D from the optical axis of receiver 25, and emits beams that are reflected back from the retroreflector 27 (arranged within the field of vision of receiver 25) and (in part) striking the receiver 25. The beams striking receiver 25 appear to issue from a virtual image 29 of the target illuminator 24. By virtue of the offset arrangement of target illuminator 24 and receiver 25, the direction to the virtual image 29 of target illuminator 24 determined by receiver 25 does not coincide with the direction to the retroreflector 27 or to reference point 28 of the retroreflector 27. Instead of the reference point 28, an erroneous reference point 30 is recorded, even when the distance of reference point 28 is known from a coaxial distance measurement. This produces a systematic measuring error, here amounting to D/2, in the determination of the position of the reference point 28 due to a non-coaxial target illumination.

The invention claimed is:

1. A method for determining the orientation of an orientation indicator using a measuring instrument having distance measuring sensors and image acquiring sensors, the method comprising the following acts:
   positioning the orientation indicator indirectly or directly at a target point where at least three reflecting segments;
   resolving by the image acquiring sensors the at least three reflecting segments having a shape and arrangement defining a detectable mutual geometric relationship, wherein from the measuring instrument toward the orientation indicator, one reflecting segment simultaneously has a directional emission of a collimated beam measured by the distance measuring sensors and a divergent beam acquired by the image acquiring sensors, wherein the collimated beam differs in wavelength and/or polarization from the divergent beam; and
   simultaneously:
   capturing the collimated beam reflected and/or scattered by the reflecting segments;
   capturing the divergent beam reflected and/or scattered by the reflecting segments;
   determining the distance from the measuring instrument to at least one reflecting segment using the distance measuring sensors; and
   determining the positions in space of the at least three reflecting segments using the image acquiring sensors.

2. A method according to claim 1, wherein the divergent beam exhibits a divergence that is equivalent to the field of vision of the image acquiring sensors and wider than the field of vision of the distance measuring sensors.

3. A method according to claim 1, wherein the emitted beams, the distance measuring sensors, and the image acquiring sensors are coaxial.

4. A method according to claim 1, wherein the orientation indicator is positioned at a target point, and the distance to the target point is determined via the orientation of the orientation indicator and its geometric relationship to the target point.

5. A method according to claim 1, wherein the distance to at least one reflecting segment and the directions in space toward the at least three reflecting segments are determined simultaneously thereby establishing the orientation and position of the orientation indicator.

6. A method according to claim 5, wherein the orientation indicator is positioned at a target point, and the position of the target point is determined via the orientation and position of the orientation indicator and its geometric relationship with the target point.

7. A method according to claim 1, wherein filters are associated with the reflecting segments and/or with the sensors.

8. A method according to claim 7, wherein the measurement by means of the distance measuring sensors is blocked in the direction of at least one reflecting segment.

9. A method according to claim 1, wherein the distance and/or position of the target point is not directly visible.

10. A method according to claim 1, further comprising controlling a machine based on the determined orientation.

11. A method according to claim 10, wherein control of the machine is automated.

12. An orientation indicator comprising:
    image acquiring sensors configured to detect a mutual geometric relationship of a three reflecting segments of a target point having at least three reflecting segments of such a shape and arrangement that they have a detectable mutual geometric relationship; and
    distance measuring sensors configured to measure a distance to one reflecting segment simultaneously with the detection of the mutual geometric relationship by the image acquiring sensors, wherein the reflecting segments have a layout such that the segment used for measuring the distance can be distinguished from the other reflecting segments regardless of the relative positions of the reflecting segments.

13. An orientation indicator according to claim 12, wherein at least one reflecting segment differs in its size from the other reflecting segments.

14. An orientation indicator according to claim 12, wherein the reflecting segments differ from each other in their sizes.

15. An orientation indicator according to claim 12, wherein a filter is associated with at least one reflecting segment.

16. An orientation indicator according to claim 15, wherein the filter is placed in front of the at least one reflecting segment.

17. An orientation indicator according to claim 12, wherein the at least one reflecting segment includes a 360° reflector, a spherical all-around reflector, a zylindrical 360° reflector, and/or a triple prism.

18. An orientation indicator according to claim 12, wherein at least one reflecting segment includes a reflector foil, triple prisms, and/or a microlens.

19. An orientation indicator according to claim 12, wherein the reflecting segments are tied together by a connecting unit.

20. An orientation indicator according to claim 19, wherein the connecting unit includes struts.

21. An orientation indicator according to claim 20, wherein the reflecting segments are disposed in a star-shaped arrangement.

22. An orientation indicator according to claim 12, wherein the orientation indicator is associated with a reflector support.

* * * * *